US010658879B2

(12) United States Patent
Asai

(10) Patent No.: US 10,658,879 B2
(45) Date of Patent: May 19, 2020

(54) CONTACTLESS POWER RECEIVING DEVICE

(71) Applicant: NISSAN MOTOR CO., LTD., Yokohama-shi, Kanagawa (JP)

(72) Inventor: Akihiro Asai, Kanagawa (JP)

(73) Assignee: NISSAN MOTOR CO., LTD., Yokohama-shi (JP)

(*) Notice: Subject to any disclaimer, the term of this patent is extended or adjusted under 35 U.S.C. 154(b) by 0 days.

(21) Appl. No.: 16/303,751

(22) PCT Filed: May 25, 2016

(86) PCT No.: PCT/JP2016/065378
§ 371 (c)(1),
(2) Date: Nov. 21, 2018

(87) PCT Pub. No.: WO2017/203616
PCT Pub. Date: Nov. 30, 2017

(65) Prior Publication Data
US 2019/0341817 A1 Nov. 7, 2019

(51) Int. Cl.
H02J 50/70 (2016.01)
H02J 50/10 (2016.01)
B60L 53/12 (2019.01)
H01F 27/36 (2006.01)
H01F 38/14 (2006.01)
H02J 7/02 (2016.01)

(52) U.S. Cl.
CPC .............. H02J 50/70 (2016.02); B60L 53/12 (2019.02); H01F 27/365 (2013.01); H01F 38/14 (2013.01); H02J 50/10 (2016.02); B60L 2270/147 (2013.01); B60Y 2200/91 (2013.01); B60Y 2300/91 (2013.01); H02J 7/025 (2013.01)

(58) Field of Classification Search
None
See application file for complete search history.

(56) References Cited

U.S. PATENT DOCUMENTS

| 6,679,796 | B2 | 1/2004 | Sungano | |
| 9,725,004 | B2 | 8/2017 | Asai et al. | |
| 9,826,670 | B2 | 11/2017 | Nakamura et al. | |
| 9,827,864 | B2 | 11/2017 | Asai et al. | |
| 10,367,377 | B2* | 7/2019 | Yuasa | H02J 50/12 |
| 2001/0024996 | A1 | 9/2001 | Sungano | |
| 2014/0159501 | A1* | 6/2014 | Kanno | H01F 38/14 307/104 |

(Continued)

FOREIGN PATENT DOCUMENTS

JP 2001-260672 A 9/2001
JP 2013-150393 A 8/2013

(Continued)

Primary Examiner — Jared Fureman
Assistant Examiner — Joel Barnett
(74) Attorney, Agent, or Firm — Foley & Lardner LLP

(57) ABSTRACT

A contactless power receiving device includes: a power reception coil unit including a power reception coil configured to contactlessly receive magnetic flux sent from a power supply coil; iron bolts fixing the power reception coil unit to a vehicle body; and a magnetic shield plate configured to suppress diffusion of the magnetic flux received by the power reception coil unit to surroundings. The magnetic shield plate is arranged below all of the iron bolts.

8 Claims, 4 Drawing Sheets

(56) References Cited

U.S. PATENT DOCUMENTS

| | | | |
|---|---|---|---|
| 2015/0061583 A1 | 3/2015 | Nakamura et al. | |
| 2015/0136499 A1 | 5/2015 | Ichikawa | |
| 2016/0236574 A1 | 8/2016 | Asai et al. | |
| 2016/0243948 A1 | 8/2016 | Asai et al. | |
| 2016/0355094 A1* | 12/2016 | Yamakawa | B60L 1/06 |
| 2017/0076854 A1* | 3/2017 | Tokura | H01F 38/14 |
| 2017/0136896 A1* | 5/2017 | Ricci | B60L 11/182 |
| 2019/0031033 A1 | 1/2019 | Ichikawa | |

FOREIGN PATENT DOCUMENTS

| | | |
|---|---|---|
| JP | 2013-219861 A | 10/2013 |
| JP | 2015-204731 A | 11/2015 |
| WO | WO-2012/132242 A1 | 10/2012 |
| WO | WO-2013/168240 A1 | 11/2013 |
| WO | WO 2015/045085 A1 | 4/2015 |
| WO | WO-2015/045663 A1 | 4/2015 |

\* cited by examiner

CONTACTLESS POWER RECEIVING DEVICE

TECHNICAL FIELD

The present invention relates to a contactless power receiving device used in contactless charging.

BACKGROUND ART

A contactless power receiving device in which magnetic flux (electric power) is contactlessly transmitted from a power transmission device to a power reception device to charge the battery is conventionally publicly known (for example, see Patent Literature 1). In the contactless power receiving device described in Patent Literature 1, a power receiver is provided inside a power receiver cover and an outer peripheral flange of the power receiver cover is coupled to a floor panel by using iron bolts. Note that a magnetic shield plate which suppresses diffusion of the magnetic flux received by the power receiver to the surroundings is arranged on the outer peripheral sides of the power receiver.

CITATION LIST

Patent Literature

Patent Literature 1: Japanese Patent Application Publication No. 2013-219861

SUMMARY OF INVENTION

Technical Problem

However, in Patent Literature 1, since the iron bolts are arranged on the inner peripheral side of the magnetic shield plate, the iron bolts are affected by a magnetic field and are heated by induction. This causes a problem that the amount of magnetic flux received by the power receiver decreases by an amount corresponding to the induction heating of the iron bolts.

Moreover, since vibration is generated in a vehicle body due to traveling of the vehicle, there is a risk that the strength of the iron bolts holding the power receiver cover decreases due to loosening of the iron bolts.

The present invention has been made to solve the conventional problems described above and an object thereof is to provide a contactless power receiving device which can achieve both of an increase in the amount of magnetic flux received by a power reception coil and secure holding of a power reception coil unit on a vehicle body at the same time.

Solution to Problem

A contactless power receiving device according to the present invention includes: a power reception coil unit fixed to a vehicle body by using iron bolts; and a magnetic shield plate which suppresses diffusion of magnetic flux received by the power reception coil unit to surroundings. The magnetic shield plate is arranged below all of the iron bolts.

Advantageous Effects of Invention

In the contactless power receiving device according to the present invention, since the magnetic shield plate reduces the magnetic flux to be received by the iron bolts in the entire magnetic flux sent from the power supply coil, the amount of magnetic flux received by the power reception coil increases. Moreover, since the magnetic shield plate is arranged below all iron bolts, the magnetic shield plate can stably receive the power reception coil unit when the power reception coil unit moves downward. As described above, the present invention can achieve both of an increase in the amount of magnetic flux received by the power reception coil and secure holding of the power reception coil unit on the vehicle body at the same time.

DESCRIPTION OF EMBODIMENTS

An embodiment of the present invention is described below in detail together with the drawings.

Figure 1:
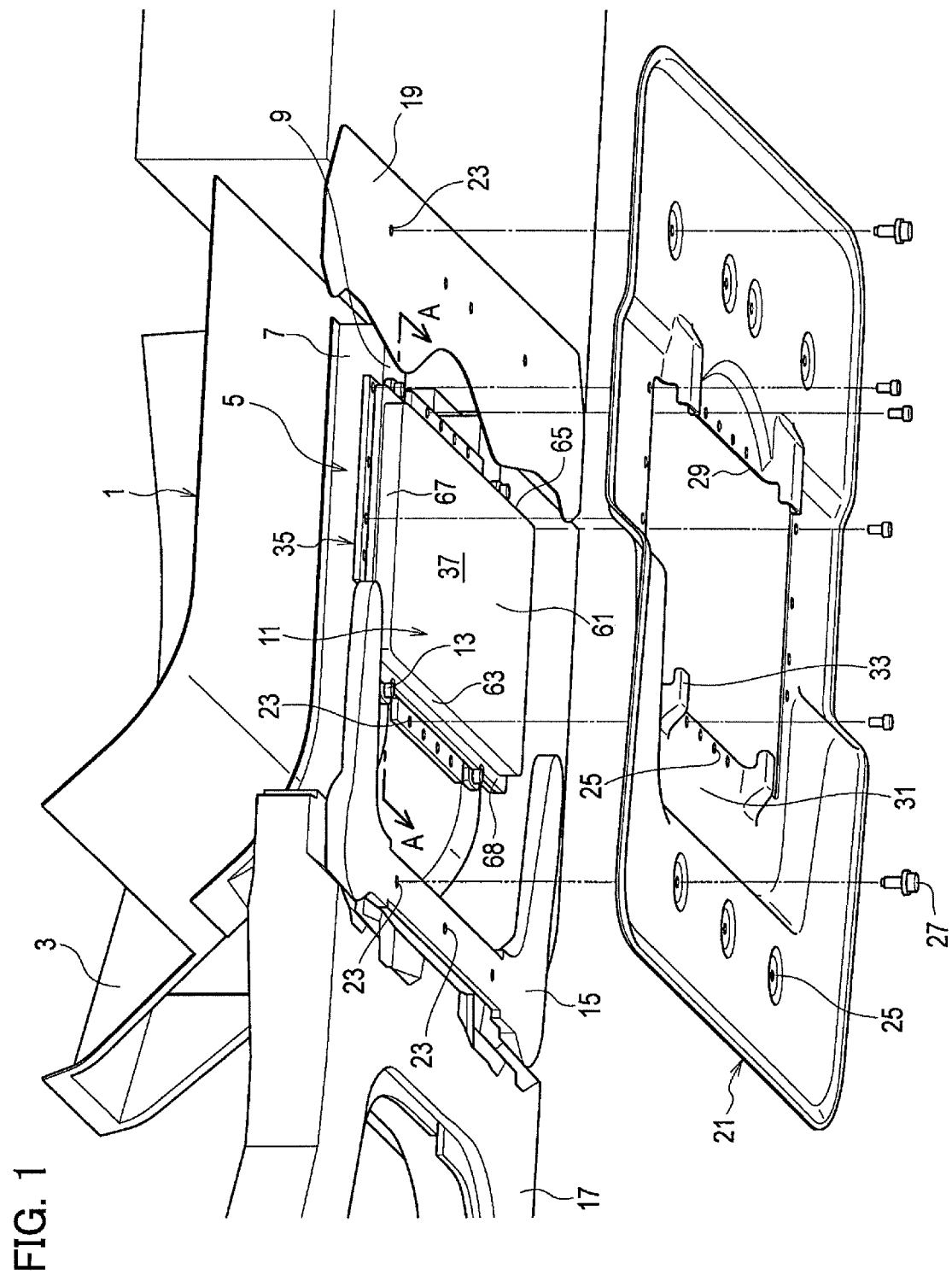
FIG. 1 is an exploded perspective view illustrating a lower portion of a vehicle body provided with a power reception coil unit according to an embodiment of the present invention.

As illustrated in FIG. 1, a floor panel 1 is arranged in a vehicle body front portion and a floor tunnel 3 protruding upward and extending in a front-rear direction is formed in a center of the floor panel 1 in a vehicle width direction. Paired left and right reinforcement members 5 extending in the front-rear direction are bonded onto a lower surface of the floor panel 1 on sides of the floor tunnel 3. The reinforcement members 5 each include side walls 7 extending in an up-down direction and the front-rear direction and a bottom wall 9 connecting lower ends of the side walls 7 to have a hat-shaped cross section, the walls 7 and 9 formed to be integral with each other.

Moreover, as described later, a power reception coil unit 11 is fastened to the bottom walls 9 of the paired left and right reinforcement members 5 by using iron bolts 13. There are arranged total of four iron bolts 13 including two iron bolts 13 in left and right ends of a front portion of the power reception coil unit 11 and two iron bolts 13 in left and right ends of a rear portion of the power reception coil unit 11.

Moreover, a front member 15 having U-shape in a plan view is arranged in front of the power reception coil unit 11, and a front frame 17 is arranged in front of the front member 15. A center plate 19 is arranged behind the power reception coil unit 11. Moreover, the lower sides of the front member 15, the power reception coil unit 11, and the center plate 19 are covered with a magnetic shield plate 21. Specifically, attachment bolt holes 23 are formed in the front member 15, the power reception coil unit 11, and the center plate 19. Meanwhile, through bolt holes 25 are provided at portions corresponding to the attachment bolt holes 23 in the magnetic shield plate 21. The magnetic shield plate 21 is fastened to the lower sides of the front member 15, the power reception coil unit 11, and the center plate 19 by using multiple bolts 27. Note that the magnetic shield plate 21 has a function of suppressing diffusion of the magnetic flux received by the power reception coil unit 11 to the surroundings.

Moreover, the magnetic shield plate 21 is formed to have a rectangular shape in the plan view and a rectangular opening 29 is formed in a center of the magnetic shield plate 21. Furthermore, the magnetic shield plate 21 includes a shield plate main body 31 and bolt shield portions 33. The shield plate main body 31 is formed in a planar shape and the through bolt holes 25 are formed in peripheral edge of the shield plate main body 31 on the opening 29 side. The bolt shield portions 33 recessed downward are formed in four portions which are front-left, front-right, rear-left, and rear-right portions in the peripheral edge of the shield plate main body 31 on the opening 29 side. The bolt shield portions 33 in these four portions are arranged at positions corresponding to the aforementioned four iron bolts 13 and the iron bolts 13 are covered with the bolt shield portions 33 from below. The magnetic shield plate 21 is arranged below all iron bolts 13 as described above. Specifically, the bolt shield portions 33 are arranged only below all iron bolts 13.

Figure 2:
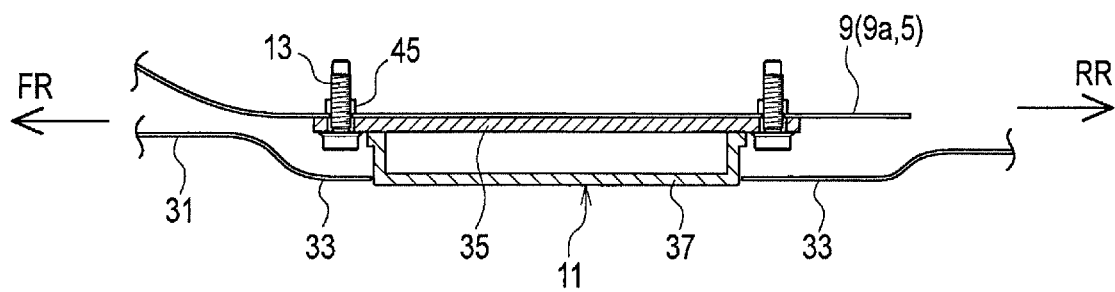
FIG. 2 is a cross-sectional view taken along the line A-A in FIG. 1.

As illustrated in FIG. 2, the power reception coil unit 11 includes an aluminum-alloy base plate 35 formed in a flat plate shape and fastened to the bottom walls 9 of the reinforcement members 5, a resin cover 37 having a hat-shaped cross section and coupled to the base plate 35, and a power reception coil 41 and a ferrite 43 (see FIG. 4) arranged inside the resin cover 37. Note that, as illustrated in FIG. 2, the iron bolts 13 are arranged in a front portion and a rear portion of the base plate 35.

Figure 3:
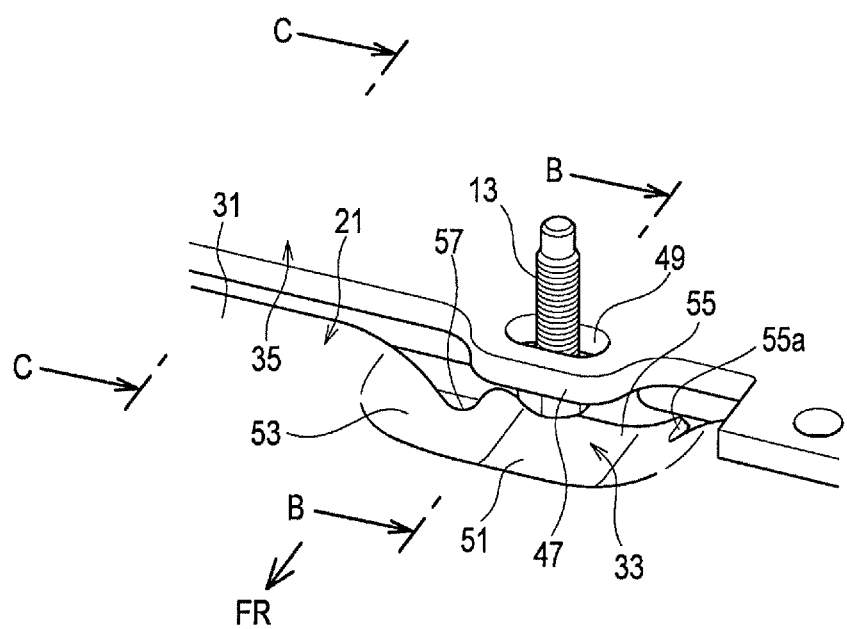
FIG. 3 is a perspective view illustrating a portion around an end of a base plate in the power reception coil unit.

As illustrated in FIG. 2, weld nuts 45 are welded to upper surfaces 9a of the bottom walls 9 of the reinforcement members 5 and, as illustrated in FIGS. 2 and 3, protrusions 47 are formed in a front end of the base plate 35 of the power reception coil unit 11 and a through bolt hole 49 elongating in the left-right direction is formed in each protrusion 47. The iron bolts 13 are inserted into the through holes 49 and are screwed to the weld nuts 45. Moreover, the bolt shield portions 33 are arranged below the respective iron bolts 13. Each of the bolt shield portions 33 includes a bottom surface 51 and a side surface 53 formed on sides of the bottom surface 51, the surfaces 51, 53 formed to be integral with each other. The entire bottom surface 51 and part of the side surface 53 protrude rearward to form a tongue piece 55. Notches 57 are formed along sides 55a of the tongue piece 55 and a predetermined gap is formed between each of the sides 55a of the tongue piece 55 and the power reception coil unit 11.

Moreover, the resin cover 37 includes a flat plate-shaped lower surface 61, a front surface 63, a rear surface 65, and side surfaces 67 formed around the lower surface 61, and flanges 68 coupled to the front surface 63, the rear surface 65, and the side surfaces 67, the surfaces 61, 63, 65, 67 and the flanges 68 formed integrally with one another.

Figure 4:
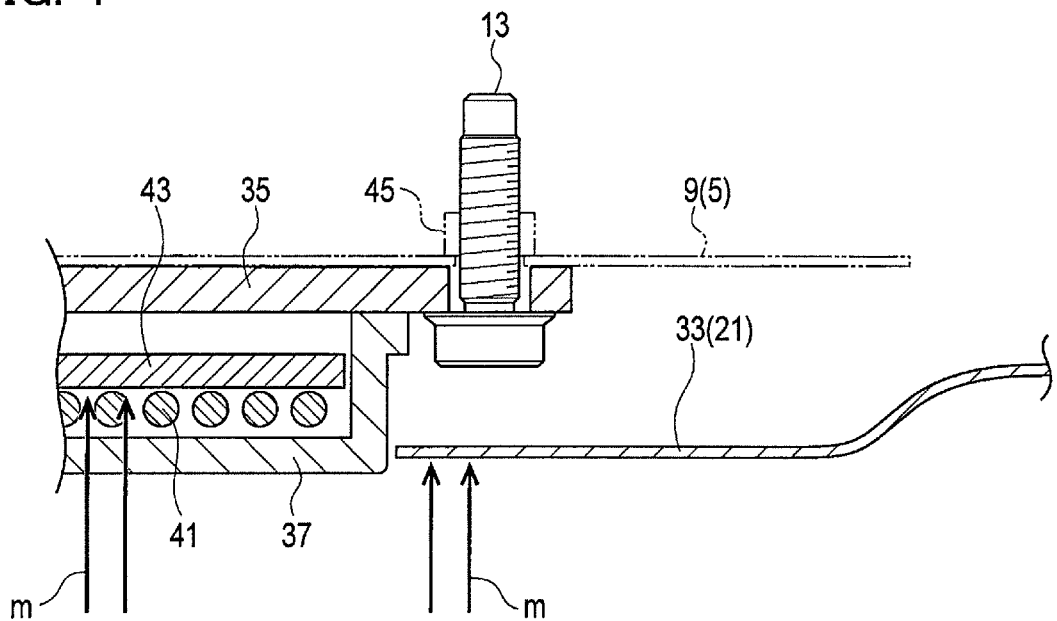
FIG. 4 is a cross-sectional view taken along the line B-B in FIG. 3 and illustrates a flow of magnetic flux sent upward from a power transmission device on the lower side.
Figure 5:
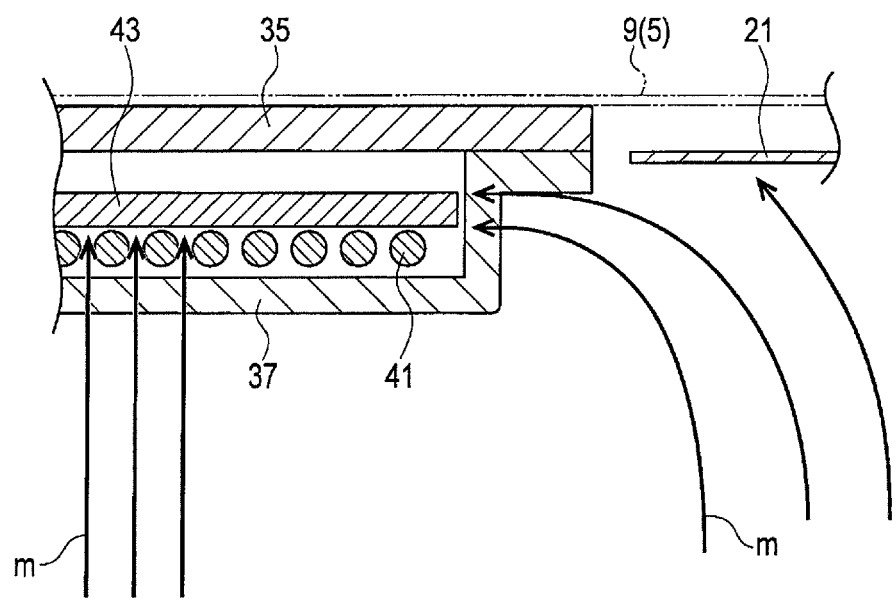
FIG. 5 is a cross-sectional view taken along the line C-C in FIG. 3 and illustrates a flow of magnetic flux sent upward from the power transmission device on the lower side.

Next, flow of magnetic flux is described by using FIGS. 4 and 5.

First, in the embodiment, as illustrated in FIG. 4, in the power reception coil 41 inside the power reception coil unit 11, magnetic flux m (see arrows) flows upward from a power transmission device below the power reception coil 41. In this case, since the cover is made of resin, the magnetic flux m is sent to the power reception coil 41 inside the power reception coil unit 11 on the upper side without being blocked by the resin cover 37. Moreover, regarding each iron bolt 13, although the magnetic flux m flows upward from the power transmission device below the power reception coil 41, the magnetic flux m is blocked by the bolt shield portion 33 in the magnetic shield plate 21. Accordingly, the amount of magnetic flux reaching the iron bolt 13 is greatly reduced.

Meanwhile, in a general portion (portion away from the iron bolt 13) illustrated in FIG. 5, the magnetic flux m flows upward from the power transmission device below the power reception coil unit 11. The magnetic flux m is sent to the power reception coil 41 inside the power reception coil unit 11 on the upper side from below and sides of power reception coil 41.

Figure 6:
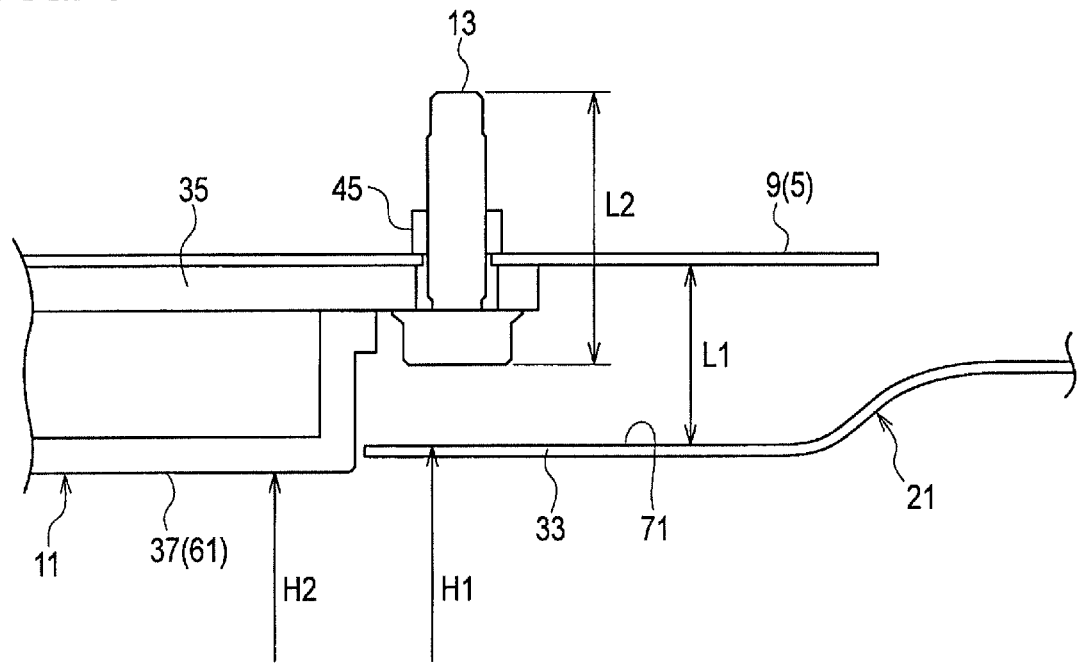
FIG. 6 is an enlarged cross-sectional view of a main portion of FIG. 2 and is an explanatory view illustrating dimensional relationships in a portion around an iron bolt.

Moreover, as illustrated in FIG. 6, a portion of the magnetic shield plate 21 arranged below each iron bolt 13 is arranged at a height position above the lower surface of the power reception coil unit 11. Specifically, a relationship of H1>H2 is established, where H1 is the height from the ground to an upper surface 71 of the bolt shield portion 33 in the magnetic shield plate 21 and H2 is the height from the ground to the lower surface 61 of the resin cover 37 in the power reception coil unit 11.

Moreover, a length relationship of L1<L2 is established, where L1 is the height from a portion of an upper surface of the magnetic shield plate 21 arranged below the iron bolt 13 to a lower surface of the bottom wall 9 (vehicle body) in the reinforcement member 5 to which the iron bolt 13 is fixed and L2 is the overall length of the iron bolt 13.

Figure 7:
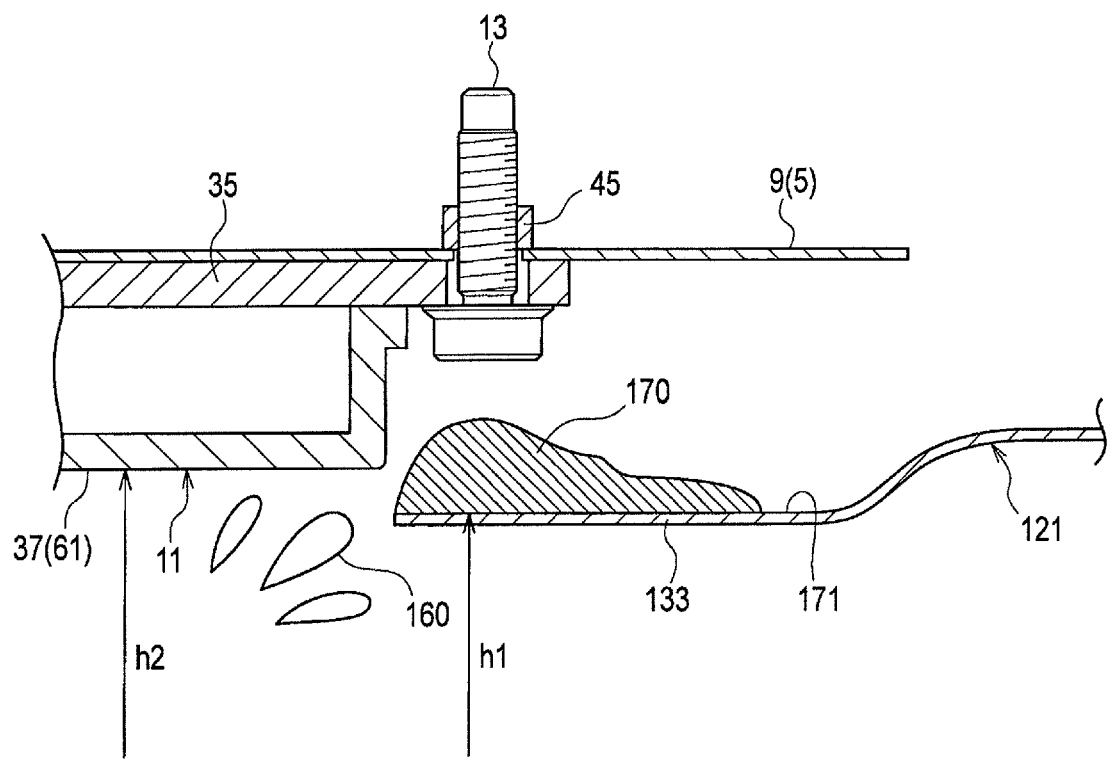
FIG. 7 is a cross-sectional view of a comparative example and corresponds to FIGS. 4 and 6.

As illustrated in FIG. 7, in a comparative example, a portion of a magnetic shield plate 121 arranged below the iron bolt 13 is arranged at a height position below the lower surface of the power reception coil unit 11. Specifically, a relationship of h2>h1 is established, where h1 is the height from the ground to an upper surface 171 of a bolt shield portion 133 in the magnetic shield plate 121 and h2 is the height from the ground to the lower surface of the resin cover 37 in the power reception coil unit 11.

In this case, since a gap is formed between a front end of the bolt shield portion 133 and the resin cover 37, rain water, mud 160, and the like on a road enter a space above the magnetic shield plate 121 from the gap while the vehicle is traveling and deposit on the magnetic shield plate 121 to form a deposition 170.

Operations and effects of the embodiment are described below.

(1) The contactless power receiving device according to the embodiment includes: the power reception coil unit 11 including the power reception coil 41 which contactlessly receives the magnetic flux sent from a power supply coil; the iron bolts 13 used to fix the power reception coil unit 11 to the reinforcement members 5 (vehicle body); and the magnetic shield plate 21 which suppresses the diffusion of the magnetic flux received by the power reception coil unit 11 to the surroundings. The magnetic shield plate 21 is arranged below all iron bolts 13.

As described above, the magnetic shield plate 21 is arranged below all iron bolts 13. Accordingly, the magnetic shield plate 21 reduces the magnetic flux m flowing toward the iron bolts 13 in the entire magnetic flux sent from the power supply coil and the amount of magnetic flux m received by the power reception coil 41 thus increases. Moreover, when strength of holding the power reception coil unit 11 on the vehicle body decreases due to loosening of the iron bolts 13 caused by vibration of the vehicle or the like and the power reception coil unit 11 moves downward, the magnetic shield plate 21 can receive the power reception coil unit 11. As described above, in the embodiment, it is possible to achieve both of an increase in the amount of magnetic flux received by the power reception coil 41 and secure holding of the power reception coil unit 11 on the vehicle body at the same time. Note that the iron bolts 13 have higher toughness and fatigue strength and lower cost than bolts made of materials such as aluminum and austenitic stainless steel. Moreover, at any of the positions where the iron bolts 13 used to fix the power reception coil unit 11 to the vehicle body are arranged, the power reception coil unit 11 can be stably received when the power reception coil unit 11 moves downward. As described above, it is possible to achieve both of an increase in the amount of magnetic flux received by the power reception coil and secure holding of the power reception coil unit 11 on the vehicle body at the same time. Note that, since the attachment points of the iron bolts 13 are located at positions preferable for supporting the power reception coil unit 11, the power reception coil unit 11 can be more stably held than in the case where the power reception coil unit 11 is received at portions other than the attachment points.

(2) The magnetic shield plate 21 includes the shield plate main body 31 and the bolt shield portions 33 which are arranged in ends of the shield plate main body 31 and which shield the iron bolts 13 from the magnetic flux m flowing toward the iron bolts 13. The bolt shield portions 33 are arranged only below all iron bolts 13.

As described above, the bolt shield portions 33 are arranged only below all iron bolts 13. Accordingly, it is possible to reduce the area of the entire magnetic shield plate 21 and reduce cost and weight from those in the case where the magnetic shield plate 21 is arranged in portions other than the portions below the iron bolts 13. Note that, since the iron bolts 13 are arranged at the positions preferable for supporting the weight of the power reception coil unit 11, it is possible to efficiently reduce the area of the magnetic shield plate 21 while providing well-balanced center of gravity of the magnetic shield plate 21.

(3) The iron bolts 13 are arranged in the front portion and the rear portion of the power reception coil unit 11, the front portion and the rear portion being determined on the assumption that the power reception coil unit 11 is mounted on a vehicle.

In contactless charging, the power reception coil unit 11 provided on the vehicle side needs to be arranged to face a power supply coil unit provided on the ground side. In this case, when the power reception coil unit 11 is misaligned relative to the power supply coil unit in the vehicle front-rear direction, the relative position can be easily corrected by moving the vehicle in the front-rear direction. However, when the power reception coil unit 11 is misaligned relative to the power supply coil unit in the vehicle left-right direction, a driver has to steer the wheel multiple times to move the vehicle to the right or left and correct the relative position. This is very cumbersome for the driver. When the power reception coil unit 11 is arranged at a position misaligned relative to the power supply coil unit, the magnetic flux flows to the iron bolts 13. As described above, the relative position can be easily corrected when the power reception coil unit 11 is misaligned in the vehicle front-rear direction but the correction in the vehicle left-right direction is difficult.

Accordingly, the arrangement in which the iron bolts 13 are arranged in the front and rear portions of the power reception coil unit 11 and the misalignment of the power reception coil unit 11 relative to the power supply coil unit can be easily corrected is more desirable than the arrangement in which the iron bolts 13 are arranged in left and right portions (sides) of the power reception coil unit 11 and the correction of the misalignment is difficult.

(4) The portions of the magnetic shield plate 21 arranged below the iron bolts 13 are arranged at the height position above the lower surface of the power reception coil unit 11.

When the portion of the magnetic shield plate 21 arranged below each of the iron bolts 13 is arranged at a height position below the lower surface of the power reception coil unit 11, a large gap is formed between the magnetic shield plate 21 and the power reception coil unit 11. In this case, there is a risk that rain water, mud, and the like on a road enter the space above the magnetic shield plate 21 from the gap while the vehicle is traveling and foreign objects deposit on the magnetic shield plate 21.

Accordingly, in order to reduce the gap formed between the magnetic shield plate 21 and the power reception coil unit 11, it is desirable to arrange the magnetic shield plate 21 at the height position above the lower surface of the power reception coil unit 11.

(5) The length relationship of L1<L2 is established, where L1 is the height from the portion of the magnetic shield plate 21 arranged below each iron bolt 13 to the bottom wall 9 (vehicle body) of the reinforcement member 5 to which the iron bolt 13 is fixed and L2 is the overall length of the iron bolt 13.

The length relationship of L1<L2 is set for the height L1 and the overall length L2 of the iron bolt 13. Accordingly, when the iron bolt 13 loosens, the iron bolt 13 comes into contact with the magnetic shield plate 21. Hence, it is possible to prevent the iron bolt 13 from falling off the vehicle.

(6) The bolt shield portions 33 are each the tongue piece 55 protruding from the peripheral edge of the shield plate main body 31 and the gap is formed between each of the sides 55a of the tongue piece 55 and the power reception coil unit 11.

The gap is formed between each of the sides of the tongue piece 55 and the power reception coil unit 11. Accordingly, when the mud 160, rain water, and the like on a road enters the gap between the tongue piece 55 and the power reception coil unit 11 while the vehicle is traveling, they are efficiently discharged to the outside of the vehicle.

Although the contactless power receiving device of the present invention has been described by using the aforementioned embodiment as an example, the present invention is not limited to this embodiment and other various embodiments can be employed within a scope not departing from the sprit of the present invention.

For example, although the power reception coil unit 11 is attached to the reinforcement members 5 at four corners by using the iron bolts 13, attachment points of the iron bolts 13 can be further provided in addition to the four corners.

REFERENCE SIGNS LIST 11 power reception coil unit
13 iron bolt
21 magnetic shield plate
31 shield plate main body
33 bolt shield portion
41 power reception coil
55 tongue piece
55a side

The invention claimed is:

1. A contactless power receiving device comprising:
a power reception coil unit including a power reception coil configured to contactlessly receive magnetic flux sent from a power supply coil;
iron bolts fixing the power reception coil unit to a vehicle body; and
a magnetic shield plate configured to suppress diffusion of the magnetic flux received by the power reception coil unit to surroundings; wherein
the magnetic shield plate is arranged below all of the iron bolts at least while the power reception coil unit receives the magnetic flux from the power supply coil.

2. The contactless power receiving device according to claim 1, wherein
the magnetic shield plate includes: a shield plate main body; and bolt shield portions arranged in ends of the shield plate main body and configured to shield against the magnetic flux flowing toward the iron bolts, and
the bolt shield portions are arranged only below all of the iron bolts.

3. The contactless power receiving device according to claim 2, wherein each of the bolt shield portions is a tongue piece protruding from a peripheral edge of the shield plate main body and a gap is formed between a side of the tongue piece and the power reception coil unit.

4. The contactless power receiving device according to claim 1, wherein the iron bolts are arranged in a front portion and a rear portion of the power reception coil unit mounted on a vehicle.

5. The contactless power receiving device according to claim 1, wherein a portion of the magnetic shield plate arranged below each of the iron bolts is arranged at a height position above a lower surface of the power reception coil unit.

6. The contactless power receiving device according to claim 1, wherein a length relationship of $L1<L2$ is established, where $L1$ is a height from a portion of the magnetic shield plate arranged below each of the iron bolts to the vehicle body to which the iron bolts are fixed and $L2$ is an overall length of each of the iron bolts.

7. The contactless power receiving device according to claim 1, wherein the magnetic shield plate is not arranged below the power reception coil while the magnetic shield plate is arranged below all of the iron bolts.

8. The contactless power receiving device according to claim 1, wherein the magnetic shield plate has an opening from which the power reception coil unit is exposed.

* * * * *